United States Patent Office 3,155,636
Patented Nov. 3, 1964

3,155,636
POLYMERIZATION OF FORMALDEHYDE
Helmuth Kritzler, Cologne-Flittard, and Kuno Wagner, Leverkusen, Germany, assignors to Farbenfabriken Bayer Aktiengesellschaft, Leverkusen, Germany, a corporation of Germany
No Drawing. Filed Feb. 16, 1960, Ser. No. 8,939
Claims priority, application Germany Feb. 28, 1959
5 Claims. (Cl. 260—67)

The present invention relates to the production of high molecular weight polyoxymethylenes by polymerization of formaldehyde, and more especially to the activation of said polymerization by carbonamides or thiocarbonamides.

It is known that formaldehyde, in the presence of suitable catalysts, such as for example tertiary and quaternary bases, and also organo metallic compounds and metal alcoholates, can be polymerized to yield high molecular weight polyoxymethylenes.

It has now been found that the compounds of a certain substantially non-basic, neutral class of substances catalyze the polymerization of formaldehyde in a particularly advantageous manner. The catalysts of this class contain the grouping of the general formula:

(I)  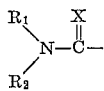

at least once in the molecule. In this formula, X represents an oxygen or sulphur atom, and (1) $R_1$ and $R_2$ each represents a hydrogen atom or a monovalent organic radical such as an aliphatic, cycloaliphatic, araliphatic or aromatic radical, or an acyl radical or $R_2$ represents a radical: Ar.NH—, Ar standing for an aromatic radical such as phenyl, naphthyl, which may be substituted by alkyl radicals having 1 to 12 carbon atoms (toluyl, ethyl phenyl, butylphenyl) or by aromatic radicals such as phenyl (diphenyl); or (2) $R_1$ and $R_2$ together (as divalent organic radicals) form part of a ring system, it being possible for this to be a cycloaliphatic ring system which may contain carbon-to-carbon double bonds and/or additional heterocyclic atoms; or (3) $R_2$ is a divalent organic radical which forms a ring system together with the carbonyl- or thiocarbonylcarbon atom and the nitrogen atom.

In the above formula suitable aliphatic radicals $R_1$ and/or $R_2$ are for instance alkyl groups having 1 to 20, preferably 1 to 6 carbon atoms; suitable cycloaliphatic radicals are for instance cyclohexyl, cyclopentyl, cycloheptyl radicals; suitable araliphatic radicals are for instance benzyl radicals; suitable aromatic radicals are for instance phenyl or naphthyl radicals which may be substituted by alkyl groups, preferably such having 1 to 6 carbon atoms, nitro, alkoxy, aroxy, ester groups or halogen atoms such as chlorine, bromine, and suitable acyl radicals are acyl radicals of monocarboxylic acids such as aliphatic, cycloaliphatic, aromatic or araliphatic monocarboxylic acids, preferably aliphatic monocarboxylic acids having 1 to 10 carbon atoms.

Catalysts which may be used according to the invention, which contain the aforesaid atom grouping at least once in the molecule and correspond to the above subgroup 1, originate for example from the class of compounds comprising ureas or thioureas. Catalysts of particularly high quality for the polymerization of monomeric formaldehyde to high molecular weight polyoxymethylenes are the ureas tetra-substituted by monovalent aliphatic hydrocarbon radicals having 1 to 6 carbon atoms. As additional examples for the classes of compounds to which the catalysts according to the invention belong, there are mentioned the carbamic acid esters, thiocarbamic acid esters, carboxylic acid amides, thiocarboxylic acid amides, allophanates, biurets and their sulphur analogues, semicarbazides, thiosemicarbazides, semicarbazine monocarboxylic acid esters, thiosemicarbazine monocarboxylic acid esters, the 1-arylhydrazocarboxylic acid esters and the hydrazodicarboxylic acid amides as well as the corresponding mono- and dithio-compounds.

Examples of such catalysts are as follows: tetramethyl urea, tetraethyl urea, tetra-n-butyl urea, N,N'-dimethyl urea, N,N'-diisopropyl-N-acetyl urea, N,N'-diphenyl urea, N,N'-dicyclohexyl urea, N,N'-dibenzylurea, tetramethyl thiourea, tetraethyl thiourea, N,N'-dimethylthiourea, and also ethyl N,N-dimethyl-carbamate, ethyl N,N-diethylcarbamate, N,N-dimethylformamide, N,N-dimethyl acetamide, as well as the corresponding sulphur compounds, and also 1-phenyl-4,4-dimethyl semicarbazide and 4,4-dimethyl semicarbazide-1-carboxylic acid ethyl ester, 1-phenylhydrazocarboxylic acid ethyl ester.

Catalysts according to the invention, which contain the aforementioned atom grouping several times in the molecule, are for example N,N,N',N'-tetra-n-propyl hydrazodicarbonamide and 2,2-dimethyl propane-1,3-diol-bis-dimethyl-carbamic acid ester.

As established above in connection with Formula I, the radicals $R_1$ and $R_2$ of the said formula can together represent chain members of the same ring system, which can contain other heterocyclic atoms as well as nitrogen. As examples of such ring systems, there are mentioned: ethylene imine, pyrrole, pyrroline and pyrrolidine, indole, carbazole, pyrazole, pyrazoline indazole, imidazole, 1,2,3-triazole, 1,2,4-triazole, tetrazole, dihydropyridine, tetrahydropyridine piperidine, tetrahydroquinoline, decahydroquinoline, tetrahydroisoquinoline, decahydroisoquinoline, the hexahydrides of pyridazine, pyrimidine, pyrazine; furthermore purine, morpholine, 1,2-oxazine, 1,4-oxazine, phenoxazine and the substituted derivatives of the aforesaid heterocyclic compounds. From the many catalysts of this type, N,N,N',N'-bis-pentamethylene urea and N,N,N',N'-bis-tetramethylene urea are mentioned as examples.

The aforementioned compounds correspond to the following general formula:

(II)  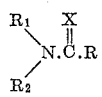

wherein $R_1$, $R_2$ and X have the same meaning as indicated in Formula I under (1) and (2), and R stands for a radical selected from the group consisting of:

wherein $R_3$ and $R_4$ have the same meaning as $R_1$ and $R_2$ as specified in connection with Formula I under (1) and (2).

wherein $R_5$ stands for an aliphatic, aromatic, cycloaliphatic or araliphatic radical as indicated in connection with substituent $R_1$ of Formula I and X has the same meaning as in Formula I.

wherein $R_5$ has the same meaning as above.

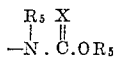

wherein the radicals $R_5$ may be the same or different.

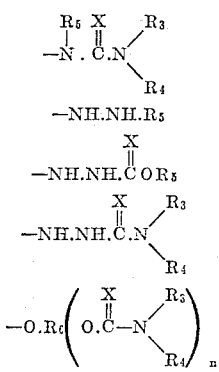

wherein $R_6$ stands for an organic hydrocarbon radical, preferably an aliphatic radical having the valency $n+1$ and $n$ stands for a whole integer from 1 to 3.

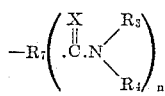

wherein $R_7$ stands for an organic hydrocarbon radical having the valency $n+1$ and $n$ stands for a whole integer from 1 to 3, preferably 1.

Finally, compounds of the above general formula can also be used as catalysts, in which the radical $R_2$ forms part of a ring system as indicated in the following general formula:

(III)

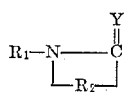

in which $R_1$ and X have the same meaning as in Formula I. Mentioned as the most important groups of substances of this type are lactams, cyclic acid imides, α-carbonyl nitrogen heterocyclic compounds and cyclic ureas. Consequently, ε-caprolactam, succinimide, phthalimide, pyrrolidone and piperidone, 1,3-dimethyl-2-oxoimidazolidine and their sulphur analogues should be mentioned.

An important advantage in the use of the catalysts according to the invention for polymerizing formaldehyde is based on the fact that these, as substantially non-basic substances, exclude basically catalyzed side reactions such as aldol condensations. Thus, reactions which can lead to branching of the polyoxymethylene chain are prevented. The absence of such basic compounds also avoids subsequent transpositions which possibly lead to thermally more instable atom groupings during the various types of aftertreatments of the polyoxymethylenes which are formed.

For carrying out the polymerization process according to the invention, it is of importance that the entire reaction is carried out under substantially anhydrous conditions. For this purpose, it is necessary to prepare in known manner a monomeric formaldehyde with a water content smaller than 0.5%, but advantageously smaller than 0.1%. Paraformaldehyde, α-polyoxymethylene or trioxane are advantageously subjected to thermal decomposition and the monomeric formaldehyde is mixed in a pyrolysis vessel with a pure anhydrous inert carrier gas, for example nitrogen. Thereafter, the formaldehyde is conducted through an extensive cooling system at a temperature of $-20°$ C. Water is frozen in the cooling system and water residues are removed by the initial polymerization of some of the formaldehyde. The formaldehyde can then be supplied to the polymerization vessel in the form of a gas or liquid. The flow velocity at which the formaldehyde is supplied to the vessel is variable and depends firstly on the speed of pyrolysis and secondly on the temperature control in the polymerization vessel.

As inert solvents there may for instance be used cyclic and acyclic ethers such as dimethyl ether, Kp. $-24.9°$, diethyl ether, dipropyl ether, dibutyl ether, dioxan, tetrahydrofuran, esters, especially esters of saturated alcohols with saturated carboxylic acids such as propylacetate, butylacetate, preferably aliphatic, cycloaliphatic aromatic hydrocarbons such as butane, hexane, heptane, cyclohexane, benzene, toluene, xylene, furthermore halogenated especially chlorinated hydrocarbons such as methylenedichloride, chloroform, carbon tetrachloride, ethylenedichloride, chlorobenzene, dichlorobenzene. The quantity of solvent employed may be varied within wide limits. There are preferably employed from 3 to 100, preferably 5 to 20 parts by volume of solvent for each part by weight of formaldehyde.

Polymerization can take place in a temperature range from $-120°$ to $+100°$ C., but it has proved advisable to work at temperatures between $-90°$ C. and $+70°$ C.

The catalysts according to the invention can be used separately or in combination with one another. Although the catalysts can be added in undissolved form to the reaction medium, it is frequently more desirable to introduce the catalyst in the form of a solution in an inert organic solvent into the reaction medium. The catalyst in such cases is usually dissolved in the same solvent as that in which the polymerization is to take place.

The quantity of catalyst used can vary within wide limits. In most cases, it is not necessary to use more than 0.2 mol of catalyst to 1000 parts by volume of solvent and on the other hand less than 0.000001 mol of catalyst to 1000 parts by volume of solvent. It is advisable to work with a catalyst concentration from 0.1 to 0.00001 mol per 1000 parts by volume of solvent in order to obtain the best results.

After completing the polymerization, the reaction product is separated from the solvent by filtration or centrifuging. The process can with advantage also be carried out continuously or semi-continuously; fresh catalyst can be added to the reaction medium at the rate at which the high polymer is separated out. The products obtained by the process can be stabilized by the known methods of acylation or etherification, as indicated by way of example in German Patent 1,139,643, British Patent 869,323, French Patent 1,238,071, and Belgian Patent 583,593, and corresponding foreign applications.

The polyoxymethylenes produced by the process of the present invention and stabilized by the processes just referred to can be worked up to high-grade plastics, with or without additions of other substances. Such substances are for example pigments, fillers, plasticizers, stabilizers and the like.

EXAMPLE 1

For the production of monomeric formaldehyde, paraformaldehyde is subjected to thermal decomposition. The monomeric formaldehyde is mixed in the pyrolysis vessel with pure dry nitrogen and thereafter conducted through an extensive cooling system at a temperature of $-20°$ C. In a second cooling system at a temperature of $-85°$ C., the formaldehyde is liquefied and supplied to the polymerization vessel. The polymerization vessel is provided with an inlet pipe for formaldehyde, a mechanical stirrer and a gas-outlet pipe. Disposed in the polymerization vessel are 1000 parts by volume of anhydrous toluene, to which are added 0.0035 part by weight of tetramethyl urea, dissolved in 3 parts by volume of anhydrous toluene. The formaldehyde is added dropwise over a period of 2½ hours and while stirring into the reaction medium cooled to −20° C., whereby polymerization takes place. After stirring for another hour at −20° C., the polymerization product is suction filtered. There is obtained a pure white high molecular weight polyoxymethylene, which is extracted by stirring twice with methanol and twice with acetone. The product is thereafter dried in vacuo for 4 hours at 60° C. The yield is 118 g. which is a yield of 98.5%, calculated on the formaldehyde (120 g.) actually introduced into the reaction vessel. The intrinsic viscosity of the formaldehyde polymer, measured in a 0.5% butyrolactone solution at 150° C. is 0.9.

EXAMPLE 2

The procedure is analogous to that indicated in Exmaple 1. 0.0516 part by weight of tetraethyl urea, dissolved in 3 parts by volume of anhydrous toluene, is added to 1000 parts by volume of anhydrous toluene. The liquid monomeric formaldehyde is added dropwise to the polymerization vessel over a period of 2 hours. After working up in accordance with Example 1, there are obtained 94 g. of pure white polyoxymethylene, this corresponding to a yield of 97%, calculated on the formaldehyde (97 g.) actually introduced into the reaction vessel. The intrinsic viscosity of the polymer is 0.75 (measured in a 0.5% butyrolactone solution at 150° C.).

EXAMPLE 3

0.0852 part by weight of tetra-n-butyl urea, dissolved in 3 parts by volume of anhydrous toluene, is added to 1000 parts by volume of anhydrous toluene. In a manner analogous to Example 1, monomeric liquid formaldehyde is added dropwise to the reaction medium over a period of 2 hours while cooling to −20° C. After polymerization is completed, working up takes place in accordance with Example 1. The dried pure white polyoxymethylene weighs 82 g., which is 96.5% based on the formaldehyde (85 g.) actually introduced into the reaction vessel. The intrinsic viscosity of the polymerization product is 0.6 (measured in a 0.5% butyrolactone solution at 150° C.).

EXAMPLE 4

Liquid monomeric formaldehyde is prepared by the procedure indicated in Example 1. As reaction medium, there are used 1000 parts by volume of anhydrous toluene, to which are added 0.02475 part by weight of N,N'-dimethyl urea, dissolved in 10 parts by volume of anhydrous toluene. The formaldehyde is introduced dropwise over a period of 2½ to 3 hours into the reaction medium cooled to −20° C. Working up takes place in accordance with Example 1. There are obtained 131 g. of pure white polyoxymethylene, corresponding to a yield of 98.5% (based on 133 g. of formaldehyde, which are actually introduced into the reaction vessel). The intrinsic viscosity of the polymer is 0.95 (measured in a 0.5% butyrolactone solution at 150° C.).

EXAMPLE 5

Using the procedure indicated in Example 1, liquid anhydrous formaldehyde is introduced dropwise into a solution of 0.0339 part by weight of ε-caprolactam in 1000 parts by volume of anhydrous toluene. Polymerization is completed after three hours. The pure white polyoxymethylene weighs 127 g., which is 97%, based on formaldehyde (131 g.) actually entering the reaction vessel. The intrinsic viscosity is 0.78 (measured in a 0.5% butyrolactone solution at 150° C.).

EXAMPLE 6

Monomeric formaldehyde is obtained by thermal decomposition of α-polyoxymethylene and is mixed in a pyrolysis vessel with pure dry nitrogen as carrier gas. The formaldehyde is thereafter conducted through an extensive cooling system at a temperature of −20° C. and supplied in gaseous form to the polymerization vessel. The reaction vessel is charged with 1000 parts by volume of anhydrous toluene and 0.0558 part by weight of N,N'-diisopropyl-N-acetyl urea, dissolved in 10 parts by volume of anhydrous toluene. The monomeric gaseous formaldehyde is introduced within 3 hours into the polymerization vessel while stirring and cooling to −20° C., an opaque suspension of a high-molecular weight polyoxymethylene being formed. After the reaction has been completed, working up takes place in accordance with Example 1 and 147 g. of pure white polyoxymethylene are isolated. The yield is 98%, based on the formaldehyde (150 g.) actually introduced into the polymerization vessel. The polyoxymethylene thus obtained has an intrinsic viscosity of 0.85 (measured in a 0.5% butyrolactone solution at 150° C.).

EXAMPLE 7

1000 parts by volume of anhydrous toluene have added thereto a solution of 0.0492 part by weight of 2,2-dimethyl-propane-1,3-diol-bis-dimethyl carbamic ester in 10 parts by volume of anhydrous toluene. While stirring and cooling to −20° C., monomeric anhydrous gaseous formaldehyde is introduced according to Example 6 into the reaction medium. Polymerization is completed after 2½ hours and after working up in accordance with Example 1, 112 g. of pure white polyoxymethylene are obtained. The yield is 97.5%, based on the formaldehyde (115 g.) actually entering the reaction vessel. The intrinsic viscosity of the product is found to be 0.9 (measured in a 0.5% butyrolactone solution at 150° C.).

EXAMPLE 8

For the production of monomeric formaldehyde, paraformaldehyde is subjected to thermal decomposition. The monomeric formaldehyde is mixed in the pyrolysis vessel with pure dry nitrogen and thereafter conducted through an extensive cooling system at a temperature of −20° C. The formaldehyde purified in this manner is supplied to the polymerization vessel which contains a solution of 0.0472 part by weight of N,N,N'-trimethylthiourea in 1300 parts by volume of anhydrous toluene. The formaldehyde is introduced within a period of about 3 hours into the aforementioned solution while stirring and cooling to −20° C. Working up takes place in accordance with Example 1. There are obtained 142 g. of pure white polyoxymethylene corresponding to a yield of 97% (based on 147 g. of formaldehyde which are actually introduced into the reaction vessel). The intrinsic viscosity of the polymer is 0.87 (measured in a 0.5% butyrolactone solution at 150° C.).

EXAMPLE 9

According to Example 8 there are carried through further polymerizations the results of which are compounded in the following Table I. Column 1 of that table contains the catalysts applied for the polymerization, column 2 the parts by weight of catalysts applied per 1300 parts by volume of anhydrous toluene, column 3 the yields of polymers obtained, column 4 the parts by weight of formaldehyde which are actually introduced into the reaction vessel, column 5 the yield in percent, column 6 in intrinsic viscosities of the polyoxymethylenes obtained which viscosities are measured in 0.5% solution in butyrolactone at 150° C., and column 7 the formulae of the catalysts applied.

Table I

| 1 | 2 | 3 | 4 | 5 | 6 | 7 |
|---|---|---|---|---|---|---|
| N,N'-carbonyl-dipyrrole | 0.064 | 156 | (160) | 97.5 | 0.83 | 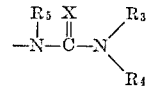 |
| N-acetylpyrrolidine | 0.0545 | 141 | (151) | 93.5 | 0.63 | 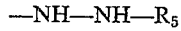 |
| 1,3-dimethyl-2-oxo-imidazolidine | 0.057 | 163 | (169) | 96.5 | 1.0 | 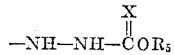 |
| 1-dimethyl-3-cyclohexyl-allophanic acid ethylester | 0.0968 | 122 | (127) | 96.0 | 0.84 | 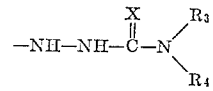 |
| 1-dimethyl-3,5-dicyclohexyl-biuret | 0.0885 | 151 | (155) | 97.5 | 0.93 | 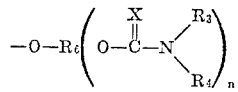 |
| 1-phenylhydrazino-carboxylic acid ethyl ester | 0.072 | 143 | (146) | 98.0 | 0.84 | 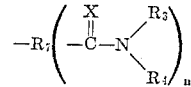 |

What we claim is:

1. A process for the production of high molecular weight polyoxymethylenes, which comprises polymerizing substantially anhydrous monomeric formaldehyde in an inert organic solvent in the presence of catalytic amounts of an organic compound of the formula:

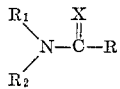

in which X represents an atom selected from the group consisting of oxygen and sulfur atoms, and wherein $R_1$ and $R_2$ represent substituents selected from the group consisting of:

(1) each $R_1$ and $R_2$ being a hydrogen atom, a monovalent alkyl radical of up to 6 carbon atoms, aralkyl radical, a lower alkyl monocarboxylic acid, a cyclohexyl radical, and an aromatic radical selected from the group consisting of phenyl and benzyl;
(2) $R_2$ being a substituent of the formula Ar.NH—, wherein Ar stands for an aromatic hydrocarbon radical and $R_1$ being a substituent as indicated under (1); and
(3) $R_1$ and $R_2$ together being members necessary to complete an organic ring system;

and R stands for a radical selected from the group consisting of:

(a)      —X—$R_5$ wherein $R_5$ is a member of the group consisting of an alkyl, a cyclohexyl, and aralkyl, and an aromatic radical as in substituent $R_1$ above and X has the same meaning as above;

(b)      —$R_5$ wherein $R_5$ has the same meaning as above;

(c) 

wherein the radicals $R_5$ are as defined above;

(d) 

wherein $R_5$ and X are as defined above, and $R_3$ and $R_4$ have the same meaning as $R_1$ and $R_2$;

(e)      —NH—NH—$R_5$ wherein $R_5$ is as defined above;

(f) 

wherein $R_5$ and X are as defined above;

(g)

$$-NH-NH-\overset{X}{\underset{}{C}}-N\begin{smallmatrix}R_3\\R_4\end{smallmatrix}$$

wherein $R^3$, $R_4$ and X are as defined above;

(h)

$$-O-R_6\left(O-\overset{X}{\underset{}{C}}-N\begin{smallmatrix}R_3\\R_4\end{smallmatrix}\right)_n$$

wherein $R_6$ stands for an aliphatic hydrocarbon radical having the valence $n+1$ where $n$ stands for a whole integer from 1 to 3, and $R_3$, $R_4$ and X are as defined above; and (i)

$$-R_7\left(-\overset{X}{\underset{}{C}}-N\begin{smallmatrix}R_3\\R_4\end{smallmatrix}\right)_n$$

wherein $R_7$ stands for an organic hydrocarbon radical having the valence $n+1$ where $n$ stands for a whole integer from 1 to 3, and $R_3$, $R_4$ and X are as defined above.

2. The process of claim 1 wherein said organic compound is an N,N-dialkylated carbamic acid ester.

3. The process of claim 1 wherein said organic compound is an N,N-dialkylated carbonic acid amide.

4. The process of claim 1 wherein said inert solvent is employed in amounts of about 3 to 100 parts by volume per 1 part by weight of formaldehyde and wherein said organic compound is employed in amounts of about 0.1 to 0.00001 mol per 1000 parts by volume of solvent.

5. The process of claim 1 wherein said polymerization is conducted at a temperature of about $-120°$ C. to $+100°$ C.

References Cited in the file of this patent

UNITED STATES PATENTS

| | | |
|---|---|---|
| 2,844,561 | Bechtold et al. | July 22, 1958 |
| 2,893,972 | Kubico et al. | July 7, 1959 |